(12) United States Patent
Kimberly

(10) Patent No.: US 8,110,132 B2
(45) Date of Patent: Feb. 7, 2012

(54) PROCESS AND MACHINE FOR MANUFACTURING LAP SIDING AND THE PRODUCT MADE THEREBY

(75) Inventor: Lawrence W. Kimberly, Farmington Hills, MI (US)

(73) Assignee: James Hardie Technology Limited, Dublin (IE)

( * ) Notice: Subject to any disclaimer, the term of this patent is extended or adjusted under 35 U.S.C. 154(b) by 423 days.

(21) Appl. No.: 12/030,563

(22) Filed: Feb. 13, 2008

(65) Prior Publication Data

US 2009/0202810 A1 Aug. 13, 2009

(51) Int. Cl.
*B29C 59/02* (2006.01)

(52) U.S. Cl. .................... 264/146; 264/284; 156/62.2

(58) Field of Classification Search ............ 264/146, 264/284; 156/62.2; 425/363, 371
See application file for complete search history.

(56) References Cited

U.S. PATENT DOCUMENTS

| | | | |
|---|---|---|---|
| 1,764,456 A | 6/1930 | Mantius | |
| 2,620,513 A | 12/1952 | Cryor et al. | |
| 3,477,967 A | 11/1969 | Resnick | |
| 3,541,194 A | 11/1970 | Resnick | |
| 3,652,486 A | 3/1972 | Young | |
| 3,669,912 A | 6/1972 | Hinton | |
| 3,849,350 A | 11/1974 | Matsko | |
| 3,931,047 A | 1/1976 | Smith | |
| 3,940,528 A | 2/1976 | Roberts | |
| 3,954,686 A | 5/1976 | Lagally | |
| 4,025,686 A | 5/1977 | Zion | |
| 4,039,718 A | 8/1977 | Kallenborn | |
| 4,053,448 A | 10/1977 | Holle | |
| 4,079,162 A | 3/1978 | Metzger | |
| 4,085,937 A | 4/1978 | Schenk | |
| 4,086,098 A | 4/1978 | Le Ruyet et al. | |
| 4,090,986 A | 5/1978 | Gormley et al. | |
| 4,095,008 A | 6/1978 | Sundstrom et al. | |
| 4,098,629 A * | 7/1978 | Goldstone ..................... 156/87 |
| 4,107,134 A | 8/1978 | Dawans | |
| 4,111,713 A | 9/1978 | Beck | |
| 4,151,155 A | 4/1979 | Chaplick | |

(Continued)

FOREIGN PATENT DOCUMENTS

EP 0695626 7/1996

(Continued)

OTHER PUBLICATIONS

"Microspheres" 3M and Zeelan Industries, Inc., 1994, 3 pages.

(Continued)

*Primary Examiner* — Christina Johnson
*Assistant Examiner* — Galen Hauth
(74) *Attorney, Agent, or Firm* — Knobbe, Martens, Olson & Bear, LLP

(57) ABSTRACT

A process for manufacturing an elongated panel formed of synthetic materials including a polymer resin matrix, a filler and a fiber reinforcement. The process includes depositing the curable composition on a conveyor belt, distributing and leveling the curable composition prior to feeding the composition into a compression apparatus in which the curable composition is partially cured as it is compressed to form the panel. The machine for manufacturing the composite panel includes a mixer for the polymer system, filler and fiber reinforcement, a distribution apparatus that distributes the curable composition prior to feeding the composition into a compacting apparatus. The process and machine may be used to form a composite siding board that includes a grain pattern on at least one side.

16 Claims, 5 Drawing Sheets

U.S. PATENT DOCUMENTS

| | | |
|---|---|---|
| 4,157,325 A | 6/1979 | Charles et al. |
| 4,231,916 A | 11/1980 | Knappenberger et al. |
| 4,238,641 A | 12/1980 | Planting et al. |
| 4,250,136 A | 2/1981 | Rex |
| 4,259,223 A | 3/1981 | Rembaum et al. |
| 4,330,634 A | 5/1982 | Rodaway |
| 4,353,998 A | 10/1982 | Gagliani et al. |
| 4,362,566 A | 12/1982 | Hinterwaldner |
| 4,363,690 A | 12/1982 | Gagliani et al. |
| 4,367,296 A | 1/1983 | Gagliani et al. |
| 4,382,821 A | 5/1983 | Davis et al. |
| 4,388,424 A | 6/1983 | Kennell et al. |
| 4,399,992 A | 8/1983 | Molitor |
| 4,401,715 A | 8/1983 | Nomura et al. |
| 4,403,048 A | 9/1983 | Blitstein et al. |
| 4,405,543 A | 9/1983 | Murphy et al. |
| 4,423,097 A | 12/1983 | Mons et al. |
| 4,428,998 A | 1/1984 | Hawkinson |
| 4,447,565 A | 5/1984 | Lula et al. |
| 4,468,014 A | 8/1984 | Strong |
| 4,479,994 A | 10/1984 | Berg |
| 4,492,732 A | 1/1985 | Murphy et al. |
| 4,522,878 A | 6/1985 | Martin et al. |
| 4,528,305 A | 7/1985 | Henry |
| 4,556,603 A | 12/1985 | Thorsrud |
| 4,558,093 A | 12/1985 | Hatzenbuhler et al. |
| 4,560,523 A | 12/1985 | Plumley et al. |
| 4,581,432 A * | 4/1986 | Blum et al. .................... 528/45 |
| 4,595,623 A | 6/1986 | Du Pont et al. |
| 4,608,403 A | 8/1986 | Sellstrom |
| 4,681,718 A | 7/1987 | Oldham |
| 4,692,480 A | 9/1987 | Takahashi et al. |
| 4,726,986 A | 2/1988 | Cannady, Jr. et al. |
| 4,744,842 A | 5/1988 | Webster et al. |
| 4,788,230 A | 11/1988 | Mudge |
| 4,819,608 A | 4/1989 | Filice et al. |
| 4,822,541 A * | 4/1989 | Nagai et al. .................... 264/42 |
| 4,837,251 A | 6/1989 | Okey et al. |
| 4,843,104 A | 6/1989 | Melber et al. |
| 4,861,649 A | 8/1989 | Browne |
| 4,897,141 A | 1/1990 | Girard |
| 4,922,596 A | 5/1990 | Wycech |
| 4,931,356 A | 6/1990 | Misevich et al. |
| 4,983,550 A | 1/1991 | Goetz et al. |
| 5,017,629 A | 5/1991 | Wilson et al. |
| 5,019,605 A | 5/1991 | Jannie |
| 5,041,472 A | 8/1991 | Myer |
| 5,075,354 A | 12/1991 | Mitsuuchi et al. |
| 5,098,096 A | 3/1992 | Gentiluomo |
| 5,100,730 A | 3/1992 | Lambers |
| 5,120,769 A | 6/1992 | Dyksterhouse et al. |
| 5,132,356 A | 7/1992 | Siddiqui |
| 5,141,972 A | 8/1992 | Sato |
| 5,158,727 A | 10/1992 | Coleman-Kammula et al. |
| 5,177,124 A | 1/1993 | Questel et al. |
| 5,189,080 A | 2/1993 | Heyke et al. |
| 5,194,459 A | 3/1993 | Sato et al. |
| 5,213,878 A | 5/1993 | Moh et al. |
| 5,217,928 A | 6/1993 | Goetz et al. |
| 5,218,016 A | 6/1993 | Jarrin et al. |
| 5,252,632 A | 10/1993 | Savin |
| 5,278,205 A | 1/1994 | Siddiqui |
| 5,278,221 A | 1/1994 | Siddiqui |
| 5,280,052 A | 1/1994 | Questel et al. |
| 5,308,909 A | 5/1994 | Chen, Sr. et al. |
| 5,336,710 A | 8/1994 | Rao et al. |
| 5,348,990 A | 9/1994 | Walpita et al. |
| 5,354,611 A | 10/1994 | Arthur et al. |
| 5,356,958 A | 10/1994 | Matthews |
| 5,369,147 A | 11/1994 | Mushovic |
| 5,384,345 A | 1/1995 | Naton |
| 5,465,176 A * | 11/1995 | Bianco et al. .................. 359/567 |
| 5,532,280 A | 7/1996 | Allen et al. |
| 5,532,295 A | 7/1996 | Harrison et al. |
| 5,665,787 A | 9/1997 | Nowak et al. |
| 5,677,045 A | 10/1997 | Nagai et al. |
| 5,691,390 A | 11/1997 | Harrison et al. |
| 5,707,723 A | 1/1998 | Harrison et al. |
| 5,837,739 A | 11/1998 | Nowak et al. |
| 5,846,357 A * | 12/1998 | Meteer et al. .................... 156/77 |
| 5,869,173 A | 2/1999 | Zheng et al. |
| 5,902,755 A | 5/1999 | Driggett et al. |
| 6,171,688 B1 | 1/2001 | Zheng et al. |
| 6,180,037 B1 | 1/2001 | Anderson et al. |
| 6,210,715 B1 | 4/2001 | Starling et al. |
| 6,352,782 B2 | 3/2002 | Yeager et al. |
| 6,428,728 B1 | 8/2002 | Sakai et al. |
| 6,454,978 B1 * | 9/2002 | Thielman .................... 264/104 |
| 6,617,398 B2 | 9/2003 | Yeager et al. |
| 6,784,125 B1 | 8/2004 | Yamakawa et al. |
| 6,787,215 B1 | 9/2004 | Burke, III et al. |
| 7,037,865 B1 | 5/2006 | Kimberly |
| 7,217,458 B2 | 5/2007 | Liu et al. |
| 7,291,234 B2 * | 11/2007 | Glorioso .................... 156/78 |
| 7,323,083 B2 | 1/2008 | Manka et al. |
| 2002/0178672 A1 | 12/2002 | Robinson et al. |
| 2003/0021955 A1 | 1/2003 | Brossman et al. |
| 2003/0127291 A1 * | 7/2003 | Wood et al. ............. 188/218 XL |
| 2004/0194421 A1 * | 10/2004 | Canti ............................. 52/741.1 |
| 2005/0019548 A1 | 1/2005 | Liu et al. |
| 2006/0100377 A1 | 5/2006 | Ouhadi |
| 2006/0269738 A1 * | 11/2006 | Kimberly .................... 428/323 |
| 2007/0044929 A1 | 3/2007 | Mohan et al. |
| 2007/0078191 A1 | 4/2007 | Guhde et al. |
| 2007/0104943 A1 | 5/2007 | D'Souza |
| 2007/0113759 A1 | 5/2007 | Roth et al. |

FOREIGN PATENT DOCUMENTS

| | | |
|---|---|---|
| EP | 1655331 A1 | 5/2006 |
| EP | 1265946 B1 | 3/2007 |
| JP | 3-155903 | 7/1991 |
| WO | WO2007/058812 A1 | 5/2007 |

OTHER PUBLICATIONS

PCT—Notification of Transmittal of the International Search Report and the Written Opinion of the International Searching Authority, or the Declaration. International Application No. PCT/US 09/32091.

* cited by examiner

PROCESS AND MACHINE FOR MANUFACTURING LAP SIDING AND THE PRODUCT MADE THEREBY

TECHNICAL FIELD

1. Field of the Invention

The present invention relates to a process and manufacturing system for manufacturing siding boards and other sheet form rigid products.

2. Background Art

Siding products, trim boards, and other sheet form rigid products are traditionally manufactured from wood. Wood products come from trees and are products of nature that are subject to variations that are inherent in natural products. Wood products can become warped when exposed to moisture. Wood products may have surface defects and internal structural faults. Wood can deteriorate over time, especially if exposed to water, unless it is protected from the elements. Considerable efforts have been made to develop lower cost, substitute products that can be used in place of wood. For example, siding products developed to replace wood lap siding include vinyl siding, fiber cement boards, aluminum siding, and the like.

Oriented strand board (OSB) is an engineered wood product that is formed by layering oriented strands or flakes of wood. The wood flakes are compressed and bonded together with wax and adhesive resins. OSB has a rough surface that makes it generally inappropriate for use in siding applications. Resins used to make OSB may emit formaldehyde. OSB absorbs water and if immersed in water for a period of time can swell 15% to 20%. OSB is subject to deterioration if exposed to freeze/thaw cycles and can attract mold or fungus unless treated.

Aluminum siding is relatively expensive and may be easily dented or scratched prior to or even after installation. Aluminum siding may discolor or fade over time when exposed to sunlight. Aluminum siding is made by rolling aluminum into sheet form blanks that are roll formed to create a lap siding effect. A gap is created between the siding panel and the supporting wall when aluminum siding is attached to the side of a building. Repeated minor impacts, such as being brushed by a tree branch, or more forceful impacts, for example, being hit by a golf ball, will dent the surface of the aluminum siding which detracts from the appearance.

Vinyl siding is currently one of the largest volume siding products. Vinyl siding is inexpensive and is resilient so that it may withstand minor impacts. However, vinyl siding provides little, if any, insulation and may discolor or fade over time when exposed to the elements. Vinyl siding does not provide strength equivalent to wood and does not provide the same quality appearance of wood siding. Vinyl siding is generally manufactured in an extrusion process. Polyvinyl chloride resin is melted and may be mixed with colorants before it is extruded through a plastic extrusion die. Standardized colors have been adopted for most vinyl siding products but this limits the colors available to consumers. Vinyl siding resists paint adhesion and is normally produced with a smooth or textured surface as a result of the extrusion process.

Fiber cement lap siding products provide a solid product that has an appearance that is similar to wood. However, fiber cement products are difficult to transport and carry to a work site because they are relatively heavy. Longer boards tend to sag substantially if not supported along their length. Fiber cement lap siding products absorb moisture which may allow mold to form behind or on the surface of the product. Paint adhesion problems may be encountered with fiber cement siding if they are not properly installed and prepared. Paint adhesion may be a problem, particularly if the fiber cement is exposed to moisture and repeated freeze/thaw cycles. Fiber cement lap siding is difficult to saw and secure to a building. Occupational safety and health issues arise with fiber cement products because they have a relatively high content of respirable crystalline silica. When fiber cement siding is cut with a saw, drilled, or nailed to a supporting surface, crystalline silica dust plumes can be released into the environment.

Fiber cement products are manufactured by combining cementatious material with various reinforcements and water that are poured into a mold. The mold containing the fiber cement product is heated under high pressure until the cementatious components of the product harden. Fiber cement lap siding is normally primed and must be painted after installation to prevent water from being reabsorbed into the product.

Problems associated with the above products, processes, and manufacturing systems are addressed by applicant's invention as summarized below.

SUMMARY OF THE INVENTION

According to one aspect of this invention, a process is provided for manufacturing an elongated panel, such as a synthetic board. According to the process, a curable composition is provided that comprises a polymer system, a volume of microspheres, and a volume of fiber reinforcement material. The curable composition is deposited on a conveyer belt and leveled. The curable composition is compressed in a compression apparatus and partially cured while being compressed in the compression apparatus to form the elongated panel.

According to another aspect of the invention, a machine is provided for manufacturing a composite panel. The machine includes a mixer in which a curable composition comprising a polymer system, a quantity of microspheres, and a quantity of a chopped fiber reinforcement are combined. A distribution apparatus receives the curable composition and forms the curable composition into random agglomerations that are limited in size and deposits the agglomerations on a feeding mechanism. A compacting apparatus is provided to which the feeding mechanism supplies the sized and separated agglomerations of the curable composition and which applies pressure to the curable composition as the reactant polymer cures.

According to another aspect of the invention, a composite siding board is provided that comprises a polymeric resin matrix, a quantity of microspheres coated by the resin matrix, and a quantity of reinforcement fibers that are mixed with the resin matrix and the microspheres. The resin matrix, microspheres, and chopped fibers are compressed to form a siding board. The siding board preferably resists cracking when nailed and does not measurably absorb water. Further characteristics of a composite lap siding board may include providing such a board that may be nailed to a supporting structural wall with nails being located more than ½ inch from the edge or corner of the board without splitting the board. In addition, the lap siding board has no measurable respirable crystalline silica according to air sampling tests for crystalline silica.

These and other aspects, features, and characteristics of the present invention will be more fully described below with reference to the attached drawings and the following detailed description of the illustrated embodiment of the present invention.

DETAILED DESCRIPTION OF THE PREFERRED EMBODIMENT(S)

Figure 1:
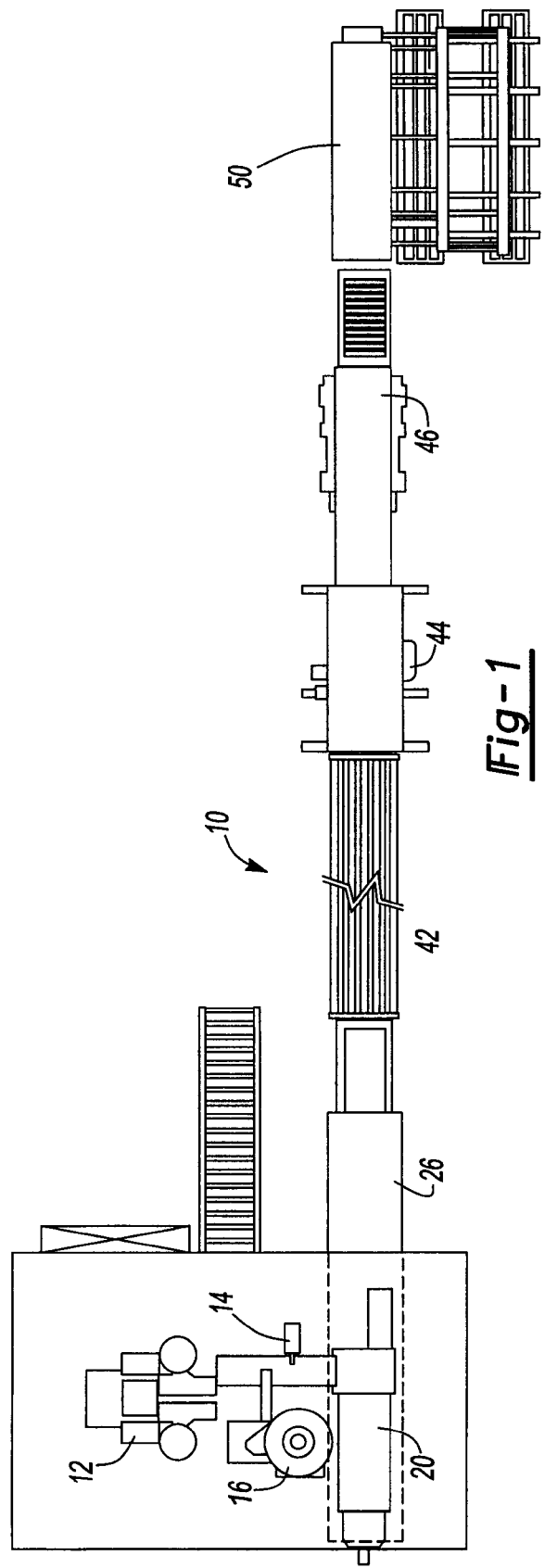
FIG. 1 is a plan view of a manufacturing system for manufacturing a composite panel in a continuous process that may be further processed to manufacture a composite lap siding board.
Figure 2:
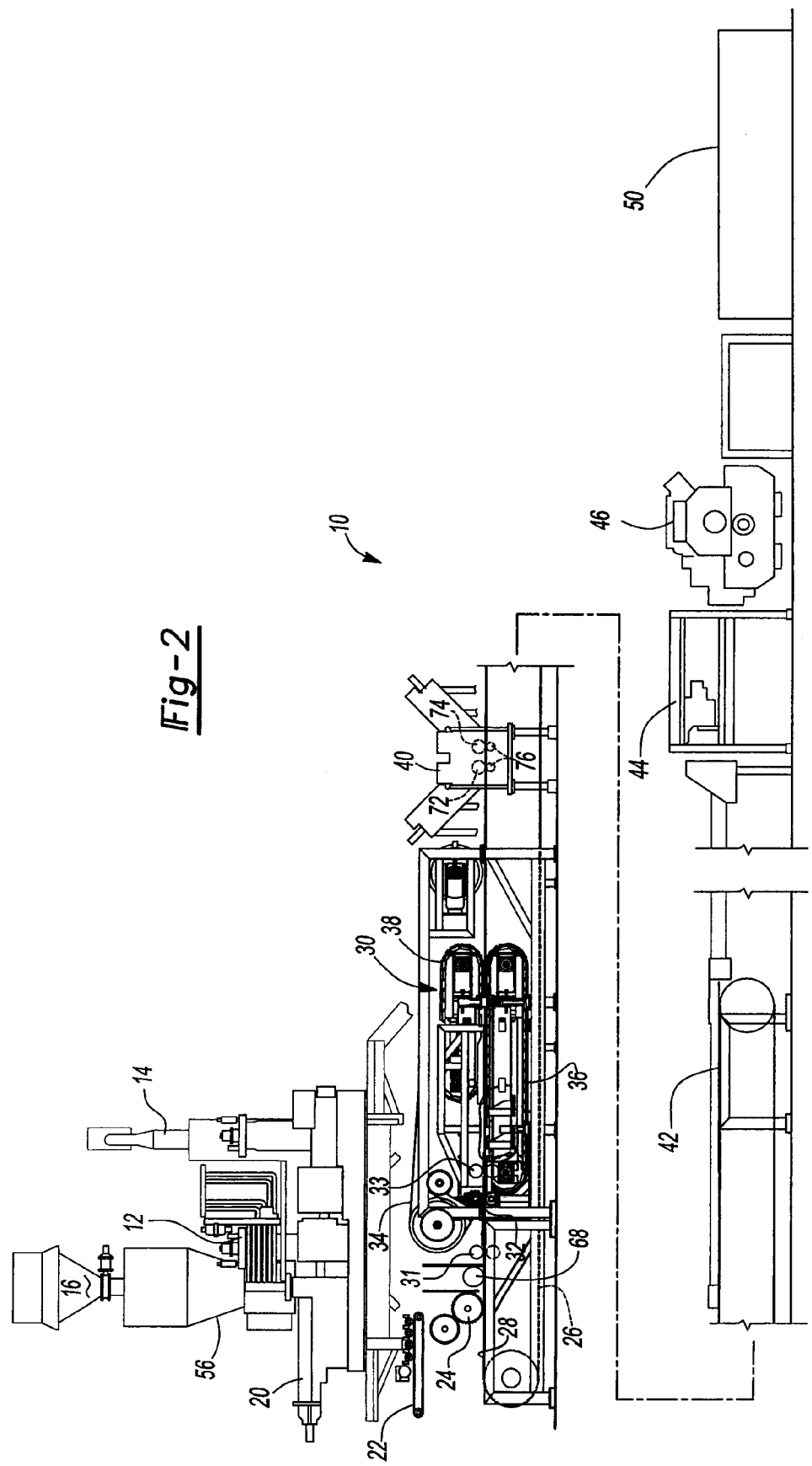
FIG. 2 is a side elevation view of the manufacturing system illustrated in FIG. 1.
Figure 3:
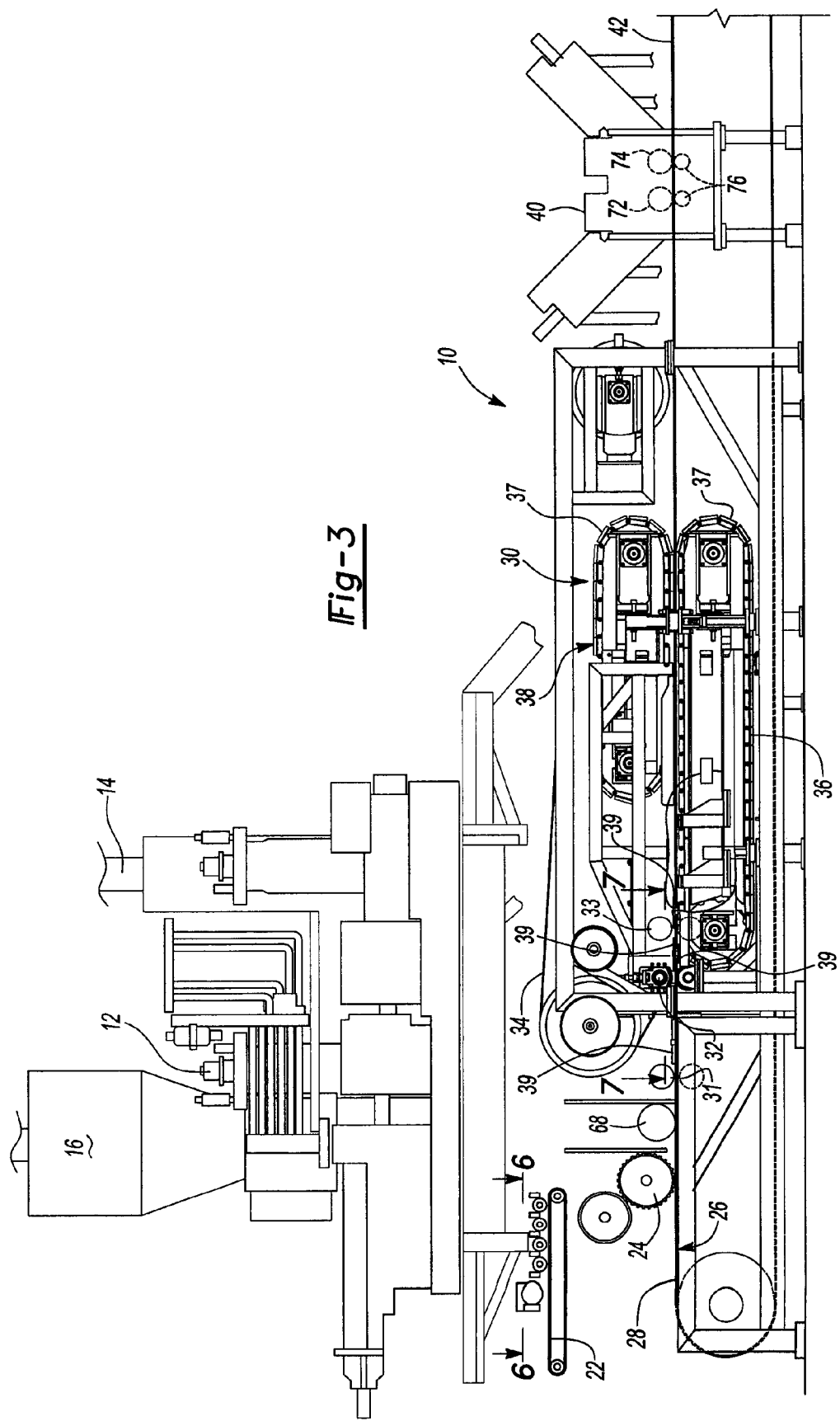
FIG. 3 is a side elevation view of the front end portion of the manufacturing system.

Referring to FIGS. 1-3, a production line 10 is illustrated that may be used to manufacture composite boards or siding according to one embodiment of the present invention. Raw materials are obtained from a resin metering system 12, a fiber reinforcement source 14 and a filler source 16.

The resin metering system 12 supplies rapid curing single or dual component thermoset resins that are provided at a controlled temperature to the production line 10. Examples of appropriate resins include epoxy resins, phenolic resins, polyester resins, polyurethane resins, vinyl ester resins, or blends of these or similar resins. The fiber reinforcement source 14 may provide reinforcing additives such as chopped fibers. Examples of chopped fibers that may be provided to the production line 10 include aramid fibers, carbon fibers, glass fibers, milled mineral wool, polyvinyl alcohol and wollastonite. In addition, other natural fibers may be used such as cotton, coir, flax, jute, wheat, rice, wood-flour, kenaf, sisal, henequen, pineapple, banana fibers, and the like.

The filler source 16 may provide man-made particles or mineral based spheres or particles such as censosheres or expanded perlite. Particle sizes of the fillers may range from 1 to 350 microns. In addition, other common fillers may be added such as calcium carbonate, alumina trihydrate, magnesium hydroxide, kaolin clay, barium sulfate, silicas and silicates.

In one example, the mixture comprises about 50% by weight of thermoset MDI polyurethane (aromatic isocyanate and polyol); about 46% by weight of expanded Perlite; and about 4% by weight of chopped glass fibers. In terms of volume, the mixture comprises about 25% by volume of the polyurethane resin, about 74% by volume of the Perlite, and about 1% by volume of the chopped glass fibers. The A and B parts of the polyurethane resin are mixed together first at a controlled temperature before adding the Perlite and glass fibers. The temperature of the mixture may be adjusted to control the reaction time and the time required to cure the product.

The resin metering system 12, fiber reinforcement source 14, and filler source 16 supply constituents to the production line 10 where they are mixed in a mixer 20. The mixer 20 may be a continuous low-shear mixing machine. After mixing in the mixing machine 20, the resin, filler and reinforcing fibers may be continuously or periodically discharged onto a distribution conveyor 22 that takes the mixture and feeds it to a conditioning wheel 24. The reinforcing fibers may comprise glass fibers or polyvinyl alcohol (PVOH) that are generally produced in the form of bundles of chopped fibers. The chopped fibers may be cut, combed, or otherwise separated, at the fiber reinforcement source 14 to separate the bundles of fibers into separate fibers or at least smaller bundles of fibers before being fed into the mixing machine.

The distribution conveyor 22 receives the mixture as it is discharged from the mixer 20 and conveys it to the conditioning wheel 24. The conditioning wheel 24 converts the non-uniform, "lumpy" core mixture into a more consistent loose accumulation of smaller agglomerations of the mixture. The uniform consistency of the mixture facilitates preparation of a uniform and consistent final product. The mixture is uniformly deposited by the conditioning wheel 24 on a lower conveyor belt 26 that includes an in-feed section 28. As used herein the term "uniform deposit" means a deposit distributed evenly across the width of the belt having less than a 15% difference in height across the belt.

The lower conveyor belt 26 is part of a compaction apparatus 30 that applies pressure on the conditioned mixture of 1 to 10 psi and preferably about 5 psi. The compaction apparatus 30 may include a pair of opposed nip rollers 31 located at the entrance to the compaction apparatus 30. Additional upper rollers 32 and 33 may be provided to apply pressure to the mixture. In addition to the lower conveyor belt 26, an upper conveyor belt 34 is provided that engages the top of the conditioned mixture as it is carried by the lower conveyor belt 26. The upper and lower conveyor belts 26 and 34 may be smooth continuous closed loop stainless steel belts.

A lower chain-on-edge slat conveyor 36 and an upper chain-on-edge slat conveyor 38 are disposed on the opposite sides of the lower and upper conveyor belts 26, 34. The chain on edge slot conveyors are made up of a plurality of slats 37, or plates, that are pivotally attached to fore-and-aft adjacent plates 37. The lower and upper chain-on-edge slat conveyors 36, 38 backup the stainless belt 26, 28 and converge to apply pressure as the mixture cures. The rollers 32 and 33 apply pressure from behind the upper belt 34 leading into the compaction apparatus 30.

Side edge rolls 39 may be provided laterally outboard of the upper and lower conveyor belts 26 and 34. The side edge rolls 39 are partially received between the belts 26 and 34. The side edge rolls 39 constrain the mixture on opposite lateral sides as the mixture is compressed between the belts 26 and 34. The side edge rolls 39, as shown, may be positioned immediately downstream relative to the nip rollers 31 and the upper rollers 32, 33.

The mixture forms an elongated panel or sheet after being compressed. The panel or sheet is transferred on the lower conveyor belt 26 through an embossing station 40 where it is embossed with a desired pattern, for example, a woodgrain pattern. The woodgrain pattern, or other pattern, may be applied to one or both sides of the elongated panel or sheet.

Following the graining or embossing step, the elongated panel is moved on a cooling conveyor or a cure portion 42 of the conveyor 26 to allow the elongated panel to cure and harden. In one embodiment, the elongated panel is passed to a slitter 44 that rip cuts boards from the sheet or panel. The slitter 44 may wet-cut using powered or unpowered large diameter cutting wheels, saw blades, or the like. Alternatively, the slitter 44 may cut with hot wires or waterjet cutters. The boards are cut to standardized widths depending upon market considerations. After slitting, the elongate panels are cut to specified lengths, preferably with a flying cut-off 46. At this point, boards of standardized lengths and widths are unloaded to a cooling conveyor 48. In another embodiment, the elongated panel may be cut to length after embossing, stacked or stored and then rip cut in a slitter when sufficiently cured. Positioning the slitter 42 and flying cut-off 46 after the cooling conveyor 42 permits the panel to more fully cure before being cut.

The boards are partially but substantially cured at this point and still may be warm as a result of the exothermic reaction of the resin system. The boards are air-cooled on the cooling conveyor 48. Alternatively, a water spray mist may be applied to the boards to reduce the temperature of the boards prior to unloading and packing.

An unloading and stacking station 50 is provided at the end of the line to stack the boards onto pallets or other packing material. The unloading/stacking station 50 may be automated and may also include additional cool down, nesting, stacking, packaging and palletizing apparatus or material handling robots. Spacers may be required to facilitate continued cooling of the boards after they are stacked since the boards are not fully cured at this time. Continued curing results in the release of heat due to the exothermic nature of the resin curing process.

The boards may be coated with a layer of primer by known painting techniques, such as spraying or rolling, to provide a readily paintable surface. The heat of the board may facilitate drying the primer paint if the primer paint is applied shortly after the boards are manufactured.

Figure 4:
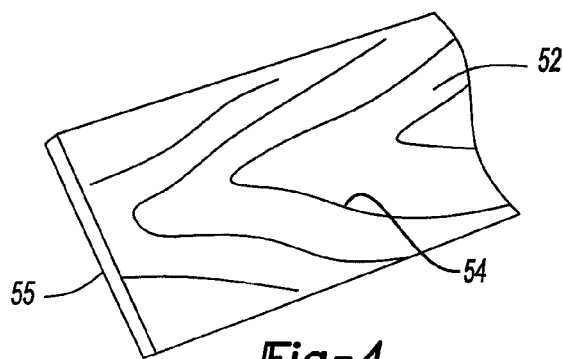
FIG. 4 is a fragmentary perspective view of a composite lap siding board made according to the present invention.

Referring to FIG. 4, a board 52 made according to the present invention is partially shown. The board 52 has a pattern 54 embossed on at least one side. The pattern 54 may provide a wood grain appearance on one side of the board 52, while the other side 55 of the board 52 may have a smooth surface. By so doing, a single type of board 52 may be sold that can be used either as a grained or a smooth lap siding product providing builders with both options and thereby minimize inventory requirements.

Figure 5:
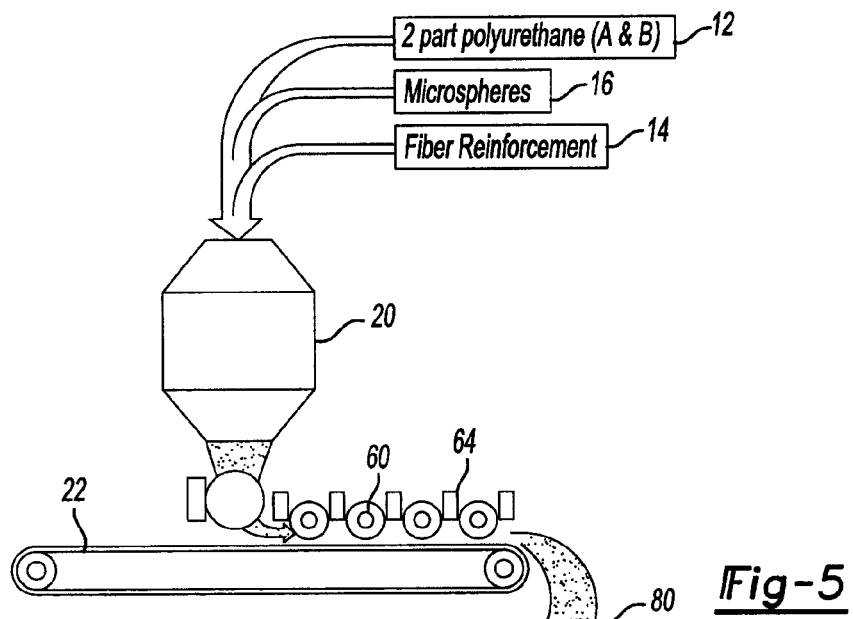
FIG. 5 is a diagrammatic side elevation view of the mixing, conditioning, and distribution portion of the manufacturing system.
Figure 5:
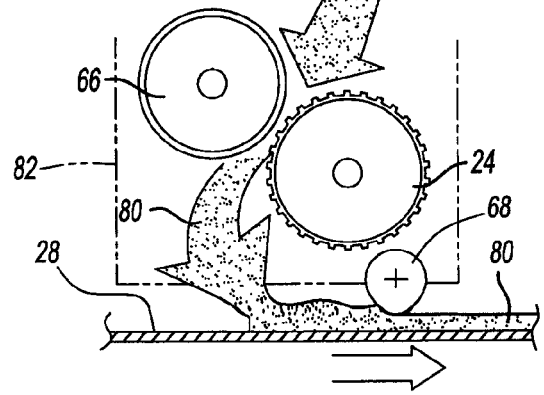

Referring to FIGS. 3 and 5, the mixing, compression and embossing processing steps will be described in greater detail. Filler material 16 is fed by a pneumatic or vacuum feeding system to a surge hopper 56 that provides a constant supply of filler material to a volumetric feeder that feeds the feeder material into the mixer 20 at a closely controlled rate. The resin metering system 12 and fiber reinforcement 14 also provide raw materials to the mixer 20. The mixer continuously mixes the raw materials and deposits them on the distribution conveyor 22.

Figure 6:
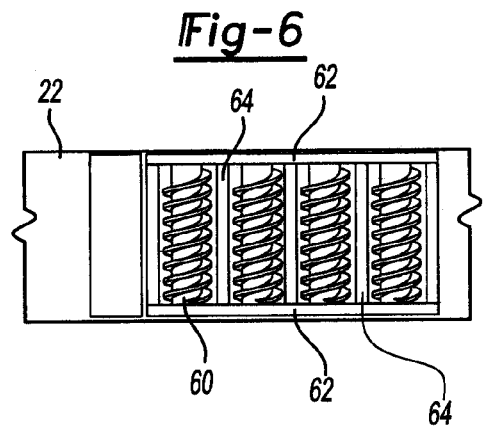
FIG. 6 is a plan view taken along the line 6-6 in FIG. 3.

Referring to FIGS. 3, 5 and 6, the distribution conveyor 22 has a leveling apparatus comprising a plurality of spreading augers 60 that spread the mixture laterally across the belt 22. The mixture is contained by end walls 62 so that the mixture remains on the conveyor 22. A plurality of screeds 64 are provided between the spreading augers 60 to control the height of the mixture as it moves between the spreading augers 60. Alternatively, the leveling apparatus may be an air knife, a vibratory leveling system, or a gravity feed leveling system.

Referring to FIG. 5, the mixture is deposited by the distribution conveyor 22 and onto the conditioning wheel 24. The conditioning wheel 24 is a rotating drum having squared blades arranged symmetrically around the circumference of the drum. The conditioning wheel 24 breaks up the pea sized agglomerations of the mixture into smaller agglomerations that resemble the appearance of snow. A roller 66 is provided adjacent the conditioning wheel 24 which cooperates with the conditioning wheel 24 prior to depositing the mixture on the lower conveyor belt 26. The mixture deposited on the lower conveyor belt 26 has a "snow-like" consistency. The mixture then passes below a leveling roller 68, or screed, that levels the mixture and evenly distributes the mixture across the lower conveyor belt 26.

Figure 7:
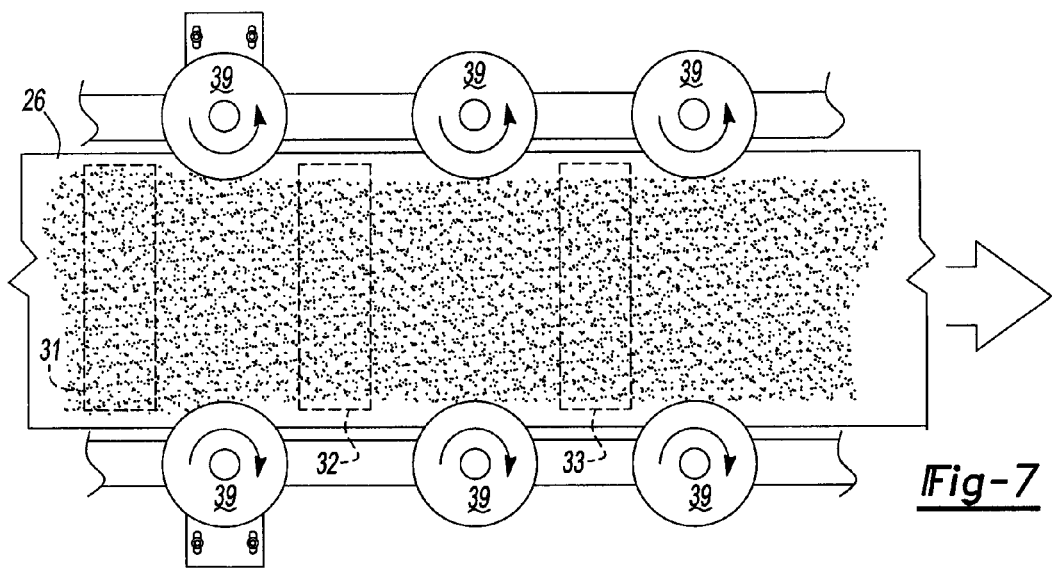
FIG. 7 is a diagrammatic plan view taken along the line 7-7 in FIG. 3 of the mixture as it is compressed by the rollers on the in feed conveyor.

Referring to FIGS. 3 and 7, the lower conveyor belt 26 feeds the mixture into the compaction apparatus 30. The nip rolls 31 initially feed the mixture in-between the belts 26 and 34. The lower conveyor belt 26 and upper conveyor belt 34 are preferably formed of smooth stainless steel to reduce any tendency of the mixture to stick to the belts. To prevent the mixture from sticking to the belts 26, 34, a release agent may be sprayed on either or both of the belts 26, 34, for example, by spraying the release agent on the conveyor belts 26, 34. The mixture is further compacted by the pressure applied by the upper rollers 32, 33 that press against the lower chain-on-edge slat conveyor 38. The mixture is then compressed between the chain-on-edge slat conveyors 36, 38. The slat conveyors apply approximately 5 psi of pressure to the conveyor belts 26, 34. The chain-on-edge slat conveyors 36, 38 are preferably mounted so that they converge from front to rear, thereby gradually increasing the compressive force that is applied to the mixture through the conveyor belts 26, 34. As best seen in FIG. 7, a plurality of side edge rollers 39 are positioned adjacent the nip rollers 31 and upper rollers 32 and 33 at the sides of the conveyor belts 26 and 34. The side edge rollers 39 restrict the mixture to the desired forming width and minimize the amount of the mixture that must be trimmed from the sides.

Figure 8:
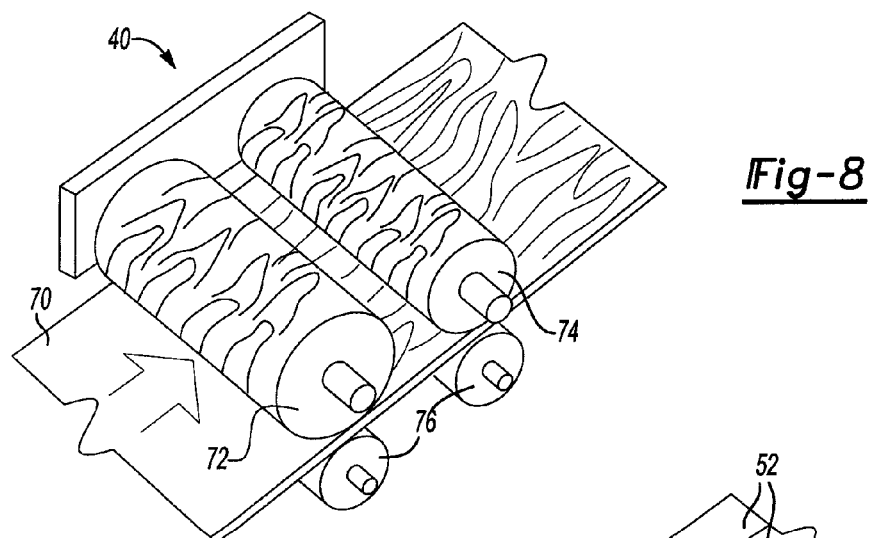
FIG. 8 is a perspective diagrammatic view of a set of grain embossing rollers forming a grain pattern along the composite panel.

Referring to FIGS. 3 and 8, the embossing station 40 is shown in greater detail. The embossing station 40 is located immediately following the compaction apparatus 30 so that the embossing step may be performed while the material is fully compressed but not fully cured. The embossing station 40 receives an elongated panel 70. The elongated panel 70 passes under a primary embossing wheel 72 and then passes to a secondary embossing wheel 74. The primary embossing wheel 72 has a larger diameter than the secondary embossing wheel 74 to provide a grain, or other pattern, that appears random and not subject to a consistently repeating appearance. To provide a realistic woodgrain pattern, the primary embossing wheel 72 applies a conventional grooved grain appearance. The secondary embossing wheel 74 applies cathedrals or other special features that overprint the grain. The dual embossing wheels 72, 74 provide an appearance that is remarkably similar to wood, such as cedar, which is considered to be the premium appearance lap siding material.

Referring to FIGS. 2, 3 and 8, the embossing wheels 72, 74 are opposed by smooth back-up rollers 76. The smooth back-up rollers 76 support the panel 70 as the embossing rollers 72, 74 emboss the panel 70. The grain pattern may be impressed to a depth of between 0.0025" and 0.005" in depth, as measured from the tops of the peaks to the lowest troughs of the grain.

Figure 9:
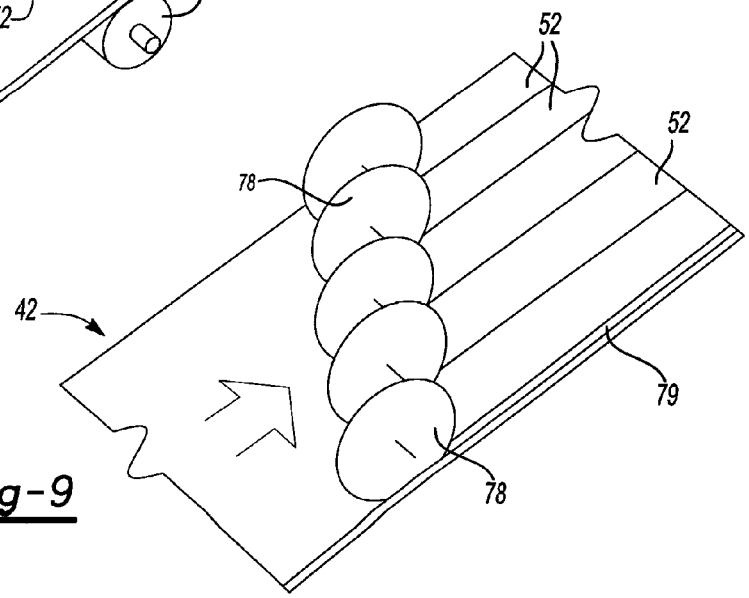
FIG. 9 is a fragmentary diagrammatic view of a plurality of slitter cutters dividing the composite panel into a plurality of composite lap siding boards.

Referring to FIG. 9, the slitter 42 is shown diagrammatically. The slitter has a plurality of slitting cutters 78 that cut the elongated panel 70 into a plurality of boards 52. The end slitting cutter trims edge waste 79 from the sides of the elongated panel 70. The edge waste 79 may be collected and recycled in a hammer-mill process or may be re-ground for recycling either before or after slitting, the boards 52 are cut-off in a flying cut-off 46. The flying cut-off 46 is computer controlled to move a saw in synchronization with the line speed as the saw cuts the boards 52. As an alternative, the panel 70 may be cut to length prior to slitting, or rip cutting, and stacked or otherwise accumulated until being cured sufficiently to be slit into board width.

The process is described with reference to FIG. 5 which provides a diagrammatic view of the mixing, conditioning and precompression portion of the machine. In one embodiment of the invention, a polymer reactant system such as, for example, a two part mixed A/B resin is provided to the mixer 20. If a polyurethane resin system is used, the polyurethane may comprise polyol and diisocyanate resin. The filler may comprise microspheres in one embodiment of the invention or other powder-type fillers that are fed into the mixer 20. Fiber reinforcement may also be added to the mixer 20 to provide additional toughness and reduce crack propagation in the final product. For example, glass fibers and/or polyvinyl alcohol (PVOH) may be added to the mixer 20. The constituents of the mixture 80 and other additives are combined in the mixer 20 on a continuous basis with the addition of constituents being volumetrically controlled to obtain a target mix ratio. After mixing, the mixture is deposited on the distribution conveyor 22 that conveys the mixture under the spreading augers 60 that move the mixture laterally across the distribution conveyor 52 while the screeds 64 level the mixture 80. The mixture 80 is then fed into a chamber 82 containing the conditioning wheel 24 and the roller 66 that break the mixture up converting the mixture into a snow-like consistency. The mixture 80 is then deposited on the in-feed section 28 of the lower conveyor belt 26.

The process continues with the loose mixture 80 being leveled by the leveling roller 68 prior to being fed into the compression apparatus. In the compaction apparatus 30, the mixture 80 is compressed and partially cured to form the elongated panel.

The finished boards 52 may be used as structural boards in place of wood and, if so, may not require embossing a woodgrain pattern. The finished product may be a composite lap siding board that is embossed with a woodgrain pattern on at least one side. The composite lap siding board comprises a polymeric resin matrix that is coated on a quantity of microspheres and combined with a quantity of reinforcement fibers. The reinforcement fibers are preferably separated into separate fibers.

The resin matrix, microspheres and chopped fibers are compressed to form a siding board 52 that does not measurably absorb water. The durability of the finished siding board resists crack propagation when nailed. The chopped reinforcement fibers may have a length of between 2 and 12 millimeters. To obtain glass fibers or polyvinyl alcohol reinforcement fibers of the desired size, strands of multiple fibers provided in the form of a roving may be chopped and then separated to provide a reinforcing fiber that is not readily visible even if the fibers are on the surface of the finished product.

The finished siding boards when cut, drilled, or fastened do not release any measurable respirable crystalline silica into the air according to applicable air sampling test procedures. The finished product is very comparable in appearance to high quality wooden lap siding boards and may be manufactured with considerable cost savings.

The finished boards are very water resistant. Tests of boards were conducted by submerging the boards in water for more than 24 hours. The results of the water absorption tests were that the weight of the board increased by less than 2%. It has also been found that if the polyol and isocyanate are not fully mixed, the resulting board may absorb more than 2% by weight of the water.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for manufacturing an elongated panel, comprising:
    providing a curable composition comprising a polymer system, a volume of microspheres, and a volume of fiber reinforcement material;
    depositing the curable composition on a first conveyor belt, wherein the curable composition is spread laterally across the first conveyor belt by a plurality of dispensing devices disposed laterally above the first conveyor belt;
    conditioning the curable composition by breaking up agglomerates in the composition into smaller agglomerations;
    depositing the curable composition to a second conveyor belt;
    leveling the curable composition on the second conveyor belt using a leveling apparatus that evenly distributes the curable composition across the second conveyor belt;
    compressing the curable composition in a compression apparatus;
    partially curing the curable composition while the composition is compressed in the compression apparatus to form the elongated panel; and
    conveying the elongated panel in a partially cured state from the compression apparatus to a subsequent station for further processing.

2. The process of claim 1 further comprising:
    conditioning the curable composition to form a plurality of agglomerations that are evenly distributed across the second conveyor belt.

3. The process of claim 1 further comprising:
    conveying the elongated panel in a partially cured state from the compression apparatus to an embossing station; and
    embossing a decorative texture on at least one side of the partially cured elongated panel as the panel is conveyed through the embossing station.

4. The process of claim 3 wherein the embossing step is performed in two steps comprising:
    embossing a first impression on one side of the panel with an embossing roll having a first circumference; and
    embossing a second impression on the one side of the panel with an embossing roll having a second circumference that is different than the first circumference.

5. The process of claim 1 further comprising:
    slitting the panel into a plurality of finished, trimmed boards of a predetermined width after the panel is conveyed from the compression apparatus.

6. The process of claim 5 further comprising:
    cutting the plurality of panels to a predetermined length.

7. The process of claim 1 further comprising:
    cutting the elongated panel to a predetermined length with a flying cut-off machine.

8. The process of claim 1 wherein the step of providing the curable composition further comprises:
    mixing a first polymer reactant and a second polymer reactant.

9. The process of claim 8 wherein the first polymer reactant is polyol and the second polymer reactant is isocyanate.

10. The process of claim 9 wherein the volume of fiber reinforcement is glass fiber that is mixed with the polyol, the isocyanate, and the microspheres in the mixing apparatus.

11. The process of claim 9 wherein the volume of fiber reinforcement is polyvinyl alcohol (PVOH) that is mixed with the polyol, the isocyanate, and the microspheres in the mixing apparatus after polyol and isocyanate are mixed together.

12. The process of claim 1 wherein the larger agglomeration are larger than 1 centimeter in diameter and the smaller agglomerations are less than 1 centimeter in diameter.

13. The process of claim 1 wherein during the compressing step pressure is applied by a pair of opposed slat conveyors to the curable composition of between 5 psi and 50 psi.

14. The process of claim 1 wherein the microspheres have a particle size of between 1 and 350 microns.

15. The process of claim 1 wherein the fiber reinforcement comprises chopped glass fibers between 2 and 24 millimeters in length and the process further comprises the step of at least partially unbundling the fibers.

16. The process of claim 15 wherein the step of unbundling the fibers further comprises combing bundles of the glass fibers to separate the bundles into smaller bundles of the glass fibers before the smaller bundles are fed into a mixing apparatus in which the polymer system, and the volume of microspheres are mixed.

* * * * *